(12) United States Patent
Mori

(10) Patent No.: US 12,711,777 B2
(45) Date of Patent: Aug. 18, 2026

(54) IMAGE PROCESSING APPARATUS

(71) Applicant: Honda Motor Co., Ltd., Tokyo (JP)

(72) Inventor: Naoki Mori, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 19/017,731

(22) Filed: Jan. 12, 2025

(65) Prior Publication Data

US 2025/0239087 A1 Jul. 24, 2025

(30) Foreign Application Priority Data

Jan. 19, 2024 (JP) ................................ 2024-006850

(51) Int. Cl.

| | |
|---|---|
| ***G06V 20/56*** | (2022.01) |
| ***G06T 7/11*** | (2017.01) |
| ***G06T 7/73*** | (2017.01) |
| ***G06V 10/44*** | (2022.01) |
| ***G06V 10/771*** | (2022.01) |

(52) U.S. Cl.

CPC ................ *G06V 20/56* (2022.01); *G06T 7/11* (2017.01); *G06T 7/73* (2017.01); *G06V 10/44* (2022.01); *G06V 10/771* (2022.01)

(58) Field of Classification Search

CPC .... G06V 20/56; G06V 30/191; G06V 10/771; G06V 10/44; G06T 7/11; G06T 7/73; G06T 2207/20041

See application file for complete search history.

(56) References Cited

U.S. PATENT DOCUMENTS

| | | | | |
|---|---|---|---|---|
| 8,705,874 | B2 * | 4/2014 | Wu | G06V 10/46 382/224 |
| 8,791,996 | B2 * | 7/2014 | Miyajima | G06F 18/28 348/148 |
| 8,891,828 | B2 * | 11/2014 | Okada | G06V 20/58 382/103 |
| 9,555,803 | B2 * | 1/2017 | Pawlicki | G01S 11/12 |
| 10,491,885 | B1 * | 11/2019 | Hicks | G06V 20/56 |
| 10,949,996 | B2 * | 3/2021 | Asai | G01C 21/28 |
| 11,450,026 | B2 * | 9/2022 | Lee | G06T 7/73 |
| 12,452,540 | B1 * | 10/2025 | Lee | H04N 23/73 |
| 2008/0166024 | A1 * | 7/2008 | Iketani | G06V 40/103 382/107 |
| 2011/0242311 | A1 * | 10/2011 | Miyajima | G06F 18/28 348/116 |
| 2012/0213412 | A1 * | 8/2012 | Murashita | G06T 7/73 382/104 |

(Continued)

FOREIGN PATENT DOCUMENTS

JP 2015011619 A 1/2015

*Primary Examiner* — Brian P Yenke
(74) *Attorney, Agent, or Firm* — Duft & Bornsen, PC

(57) ABSTRACT

An image processing apparatus is configured to detect an external situation of a vehicle based on image information acquired by a detection unit mounted on the vehicle. The image processing apparatus includes a microprocessor configured to perform: extracting feature points of an object included in the image information, selecting feature points to be used for processing from a plurality of feature points, dividing the image information into a plurality of regions, and adjusting the number of feature points to be selected in each of the plurality of regions based on distances to objects included in the plurality of regions.

8 Claims, 6 Drawing Sheets

(56) References Cited

U.S. PATENT DOCUMENTS

2016/0014406 A1* 1/2016 Takahashi ................. G01S 5/16
348/148
2016/0140718 A1* 5/2016 Ishida .................. H04N 13/239
345/419
2018/0136314 A1* 5/2018 Taylor ................... G01S 17/931
2019/0102642 A1* 4/2019 Tanabe ................. H04N 13/239
2019/0220997 A1* 7/2019 Asai ....................... G01C 21/28
2022/0128700 A1* 4/2022 Saranin ..................... G06T 7/11
2022/0172396 A1* 6/2022 Okuma ................... G06T 7/215
2022/0254056 A1* 8/2022 Konishi .................... G06T 7/73
2022/0277515 A1* 9/2022 Chandler ................ G06T 19/00
2022/0291013 A1* 9/2022 Konishi ............. G01C 21/3896
2022/0307861 A1* 9/2022 Konishi ............. G01C 21/3822
2023/0314162 A1* 10/2023 Mori ...................... G06V 10/82
701/409
2023/0314163 A1* 10/2023 Mori ...................... G01C 21/30
701/413
2024/0185434 A1* 6/2024 Wyffels .................. G06V 20/58
2024/0331408 A1* 10/2024 Konishi ............... G06V 20/588
2025/0022143 A1* 1/2025 Li .......................... G05D 1/021
2025/0054265 A1* 2/2025 Zhu ........................... G06T 3/40
2025/0237510 A1* 7/2025 Mori ...................... G01C 21/30
2025/0252755 A1* 8/2025 Konishi ................. G06V 20/58
2026/0009654 A1* 1/2026 Mori .................. G01C 21/3811

* cited by examiner

IM

| 25 | 26 | 27 | 28 | 29 | 30 |
| --- | --- | --- | --- | --- | --- |
| 19 | 20 | 21 | 22 | 23 | 24 |
| 13 | 14 | 15 | 16 | 17 | 18 |
| 7 | 8 | 9 | 10 | 11 | 12 |
| 1 | 2 | 3 | 4 | 5 | 6 |

IMAGE PROCESSING APPARATUS

CROSS-REFERENCE TO RELATED APPLICATION

This application is based upon and claims the benefit of priority from Japanese Patent Application No. 2024-006850 filed on Jan. 19, 2024, the content of which is incorporated herein by reference.

BACKGROUND

Technical Field

The present invention relates to an image processing apparatus for detecting an external situation of a subject vehicle based on image information.

Related Art

As this type of technology, there has been known an information detection device that divides a captured image into a short distance region having a large parallax value and a long distance region having a small parallax value, detects a feature amount (road surface candidate point) using a standard or a detection method suitable for each divided region, and improves road surface detection accuracy in each region (see JP 2015-11619 A).

In general, since it is highly necessary to detect an external situation of a traveling vehicle in real time, it is required to reduce a load of processing by suppressing the number of feature points on an image. However, it cannot be said that the reduction of the processing load is sufficient in the conventional technology.

The detection of the external situation of the vehicle enables smooth movement of the vehicle, thereby leading to improvement of traffic convenience and safety. This enables a contribution to development of a sustainable transportation system.

SUMMARY

An aspect of the present invention is an image processing apparatus configured to detect an external situation of a vehicle based on image information acquired by the detection unit mounted on the vehicle. The image processing apparatus includes a microprocessor configured to perform: extracting feature points of an object included in the image information; selecting feature points to be used for processing from a plurality of feature points extracted in the extracting; dividing the image information into a plurality of regions; and adjusting a number of feature points to be selected in each of the plurality of regions based on distances to objects included in the plurality of regions.

BRIEF DESCRIPTION OF DRAWINGS

The objects, features, and advantages of the present invention will become clearer from the following description of embodiments in relation to the attached drawings, in which.

DETAILED DESCRIPTION

An embodiment of the invention will be described below with reference to the drawings.

An image processing apparatus according to an embodiment of the invention is applicable to a vehicle having a self-driving capability, that is, a self-driving vehicle. Note that a vehicle to which the image processing apparatus according to the present embodiment is applied is referred to as a subject vehicle in some cases so as to be distinguished from other vehicles. The subject vehicle may be any of an engine vehicle having an internal combustion engine (engine) as a driving power source, an electric vehicle having a driving motor as a driving power source, and a hybrid vehicle having an engine and a driving motor as a driving power source. The subject vehicle is capable of traveling not only in a self-drive mode that does not require a driver's driving operation but also in a manual drive mode that requires a driver's driving operation.

Figure 1:
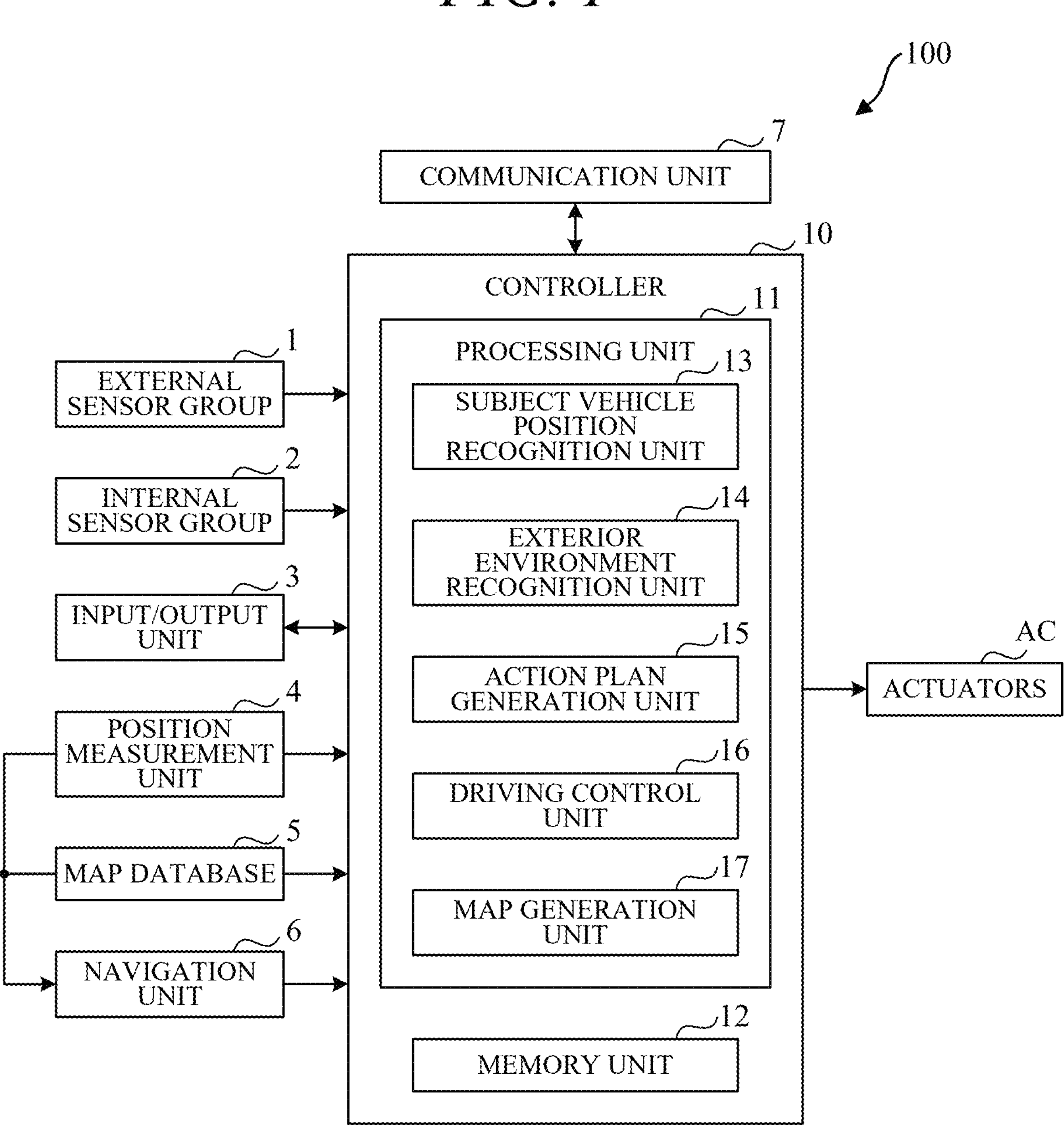
FIG. 1 is a block diagram schematically illustrating an overall configuration of a vehicle control system according to an embodiment of the present invention.

First, a schematic configuration of the subject vehicle related to self-driving will be described. FIG. 1 is a block diagram schematically illustrating an overall configuration of a vehicle control system 100 of a subject vehicle including the image processing apparatus according to the present embodiment. As illustrated in FIG. 1, the vehicle control system 100 mainly includes a controller 10, an external sensor group 1, an internal sensor group 2, an input/output device 3, a position measurement unit 4, a map database 5, a navigation unit 6, a communication unit 7, and traveling actuators AC each communicably connected to the controller 10.

The external sensor group 1 is a generic term for a plurality of sensors (external sensors) that detect an external situation which is peripheral information of the subject vehicle. For example, the external sensor group 1 includes a LiDAR that measures scattered light with respect to irradiation light in all directions of the subject vehicle and measures the distance from the subject vehicle to surrounding obstacles, a radar that detects other vehicles, obstacles, and the like around the subject vehicle by irradiating electromagnetic waves and detecting reflected waves, and a camera that is installed in the subject vehicle, has an imaging element (image sensor) such as a charge coupled device (CCD) or a complementary metal oxide semiconductor (CMOS), and captures images of the surrounding (front, rear, and side) of the subject vehicle.

The internal sensor group 2 is a generic term for a plurality of sensors (internal sensors) that detect a traveling state of the subject vehicle. For example, the internal sensor group 2 includes a vehicle speed sensor that detects a vehicle speed of the subject vehicle, an acceleration sensor that detects an acceleration in a front-rear direction of the subject vehicle and an acceleration in a left-right direction (lateral acceleration) of the subject vehicle, a revolution sensor that detects the number of revolutions of the traveling drive source, and a yaw rate sensor that detects a rotation angular speed around a vertical axis of the center of gravity of the subject vehicle. The internal sensor group 2 also includes sensors that detect a driver's driving operation such as an operation on an accelerator pedal, an operation on a brake pedal, or an operation on a steering wheel in the manual drive mode.

Input/output device 3 is a generic term for devices to and from which a command is input by a driver or information is output to the driver. For example, the input/output device 3 includes various switches to which a driver inputs various commands by operating an operation member, a microphone to which the driver inputs commands with voice, a display that provides information to the driver via a display image, a speaker that provides information to the driver with voice, and the like.

The position measurement unit (global navigation satellite system (GNSS) unit) 4 includes a positioning sensor that receives a signal for positioning, transmitted from a positioning satellite. The positioning satellite is an artificial satellite such as a global positioning system (GPS) satellite or a quasi-zenith satellite. The position measurement unit 4 uses positioning information received by the positioning sensor to measure a current position (latitude, longitude, and altitude) of the subject vehicle.

The map database 5 is a device that stores general map information used for the navigation unit 6, and is constituted of, for example, a hard disk or a semiconductor element. The map information includes road position information, information on a road shape (curvature or the like), and position information on intersections and branch points. Note that the map information stored in the map database 5 is different from highly accurate map information stored in a memory unit 12 of the controller 10.

The navigation unit 6 is a device that searches for a target route on roads to a destination that has been input by a driver and that performs guidance along the target route. The entry of the destination and the guidance along the target route are performed via the input/output device 3. The target route is calculated on the basis of a current position of the subject vehicle measured by the position measurement unit 4 and the map information stored in the map database 5. The current position of the subject vehicle can be measured using the detection values of the external sensor group 1, and the target route may be calculated on the basis of the current position and the highly accurate map information stored in the memory unit 12.

The communication unit 7 communicates with various servers not illustrated via a network including wireless communication networks represented by the Internet, a mobile telephone network, and the like, and acquires the map information, travel history information, traffic information, and the like from the servers periodically or at an arbitrary timing. The travel history information of the subject vehicle may be transmitted to the server via the communication unit 7 in addition to the acquisition of the travel history information. The network includes not only a public wireless communication network but also a closed communication network provided for each predetermined management region, for example, a wireless LAN, Wi-Fi (registered trademark), Bluetooth (registered trademark), and the like. The acquired map information is output to the map database 5 and the memory unit 12, and the map information is updated.

The actuators AC are traveling actuators for controlling traveling of the subject vehicle. In a case where the traveling drive source is an engine, the actuators AC include a throttle actuator that adjusts an opening (throttle opening) of a throttle valve of the engine. In a case where the traveling drive source is a traveling motor, the actuators AC includes the traveling motor. The actuators AC also include a brake actuator that operates a braking device of the subject vehicle and a steering actuator that drives a steering device.

The controller 10 includes an electronic control unit (ECU). More specifically, the controller 10 includes a computer including a processing unit 11 such as a CPU (microprocessor), the memory unit 12 such as a ROM and a RAM, and other peripheral circuits (not illustrated) such as an I/O interface. Note that although a plurality of ECUs having different functions such as an engine control ECU, a driving motor control ECU, and a braking device ECU can be separately provided, in FIG. 1, the controller 10 is illustrated as a set of these ECUs for convenience.

The memory unit 12 stores highly accurate detailed map information (referred to as high-precision map information). The high-precision map information includes information on the position of roads, road geometry (curvature and others), road gradients, positions of intersections and junctions, types and positions of road division lines such as white lines, number of lanes, lane width and position of each lane (center position of lanes and boundaries of lane positions), positions of landmarks (buildings, traffic lights, signs, and others) on maps, and road surface profiles such as road surface irregularities. In the embodiment, center lines, lane lines, outside lines, and the like are collectively referred to as road division lines.

The high-precision map information stored in the memory unit 12 includes map information (referred to as external map information) acquired from the outside of the subject vehicle via the communication unit 7 and a map (referred to as internal map information) created by the subject vehicle itself using detection values by the external sensor group 1 or detection values of the external sensor group 1 and the internal sensor group 2.

The external map information is, for example, information of a map that has been acquired via a cloud server (referred to as a cloud map), and the internal map information is, for example, information of a map (referred to as an environmental map) including three-dimensional point cloud data generated by mapping using a technology such as simultaneous localization and mapping (SLAM), for example.

The external map information is shared among the subject vehicle and other vehicles, whereas the internal map information is map information that is exclusive to the subject vehicle (for example, map information that the subject vehicle owns by itself). For roads on which the subject vehicle has never traveled, newly constructed roads, and the like, environmental maps are created by the subject vehicle itself. Note that the internal map information may be provided for a server apparatus or other vehicles via the communication unit 7.

In addition to the above-described high-precision map information, the memory unit 12 also stores traveling trajectory information of the subject vehicle, various control programs, and thresholds used in the programs.

The processing unit 11 includes a subject vehicle position recognition unit 13, an exterior environment recognition unit 14, an action plan generation unit 15, a driving control unit 16, and a map generation unit 17 as functional configurations.

The subject vehicle position recognition unit 13 recognizes (or estimates) the position (subject vehicle position) of the subject vehicle on a map, on the basis of the position information of the subject vehicle, obtained by the position measurement unit 4, and the map information of the map database 5.

The subject vehicle position may be recognized (estimated) using the high-precision map information stored in the memory unit 12 and the peripheral information of the subject vehicle detected by the external sensor group 1, whereby the subject vehicle position can be recognized with high accuracy.

The movement information (moving direction, moving distance) of the subject vehicle may be calculated on the basis of the detection values by the internal sensor group 2, and the subject vehicle position may be recognized accordingly. Note that when the subject vehicle position can be measured by a sensor installed on a road or outside a road side, the subject vehicle position can be recognized by communicating with the sensor via the communication unit 7.

The exterior environment recognition unit 14 recognizes an external situation around the subject vehicle, on the basis of the signal from the external sensor group 1 such as a LiDAR, a radar, and a camera. For example, the position, speed, and acceleration of a surrounding vehicle (a forward vehicle or a rearward vehicle) traveling around the subject vehicle, the position of a surrounding vehicle stopped or parked around the subject vehicle, the positions and states of other objects, and the like are recognized. Other objects include signs, traffic lights, markings such as division lines and stop lines of roads, buildings, guardrails, utility poles, signboards, pedestrians, bicycles, and the like. The states of other objects include a color (red, green, yellow) of a traffic light, and the moving speed and direction of a pedestrian or a bicycle. A part of the stationary object among the other objects constitutes a landmark serving as an index of the position on the map, and the exterior environment recognition unit 14 also recognizes the position and type of the landmark.

The action plan generation unit 15 generates a driving path (target path) of the subject vehicle from a current point of time to a predetermined time ahead on the basis of, for example, the target route calculated by the navigation unit 6, the high-precision map information stored in the memory unit 12, the subject vehicle position recognized by the subject vehicle position recognition unit 13, and the external situation recognized by the exterior environment recognition unit 14. When there is a plurality of paths that are candidates for the target path on the target route, the action plan generation unit 15 selects, from among the plurality of paths, an optimal path that satisfies criteria such as compliance with laws and regulations, and efficient and safe traveling, and sets the selected path as the target path. The action plan generation unit 15 generates an action plan corresponding to the generated target path. The action plan generation unit 15 generates various action plans corresponding to passing traveling for passing a preceding vehicle, lane change traveling for changing a travel lane, tracking traveling for tracking a preceding vehicle, lane keeping traveling for keeping a lane without departing from a travel lane, deceleration traveling or acceleration traveling, and the like. At the generation of the target path, the action plan generation unit 15 first determines a travel mode, and then generates the target path on the basis of the travel mode.

In the self-drive mode, the driving control unit 16 controls each of the actuators AC such that the subject vehicle travels along the target path generated by the action plan generation unit 15. More specifically, the driving control unit 16 calculates a requested drive force for obtaining target acceleration for each unit time calculated by the action plan generation unit 15 in consideration of traveling resistance determined according to a road gradient or the like in the self-drive mode. For example, the actuators AC are feedback-controlled such that an actual acceleration detected by the internal sensor group 2 becomes the target acceleration. More specifically, the actuators AC are controlled such that the subject vehicle travels at the target vehicle speed and the target acceleration. Note that in the manual drive mode, the driving control unit 16 controls each of the actuators AC in accordance with a travel command (steering operation or the like) from the driver acquired by the internal sensor group 2.

The map generation unit 17 generates an environmental map in the surroundings of the road on which the subject vehicle has traveled, as internal map information, by using the detection values that have been detected by the external sensor group 1 while the subject vehicle is traveling in the manual drive mode. For example, an edge indicating an outline of an object is extracted from a plurality of frames of camera images that have been acquired by the camera, on the basis of luminance and color information for each of pixels, and feature points are extracted with use of such edge information. The feature points are, for example, intersections of edges, and correspond to corners of buildings, corners of road signs, or the like. The map generation unit 17 calculates a three-dimensional position of a feature point while estimating the position and attitude of the camera so that identical feature points converge on a single point in a plurality of frames of camera images, in accordance with the algorithm of the SLAM technology. By performing this calculation processing for each of the plurality of feature points, an environmental map including the three-dimensional point cloud data is generated.

Note that, instead of the camera, with use of data acquired by a radar or a LiDAR, the environmental map may be generated by extracting feature points of objects in the surroundings of the subject vehicle.

In addition, in generating the environmental map, upon determination that a ground object (examples including a division line of a road, a traffic light, and a traffic sign) that is important in terms of a map is included in a camera image in accordance with object detection in pattern matching processing or the like, the map generation unit 17 adds position information of a point corresponding to a feature point of the ground object based on the camera image to the environmental map, and stores the position information in the memory unit 12.

The subject vehicle position recognition unit 13 performs position recognition processing of the subject vehicle in parallel with map creation processing by the map generation unit 17. That is, the position of the subject vehicle is estimated, on the basis of a change in the position of the feature point over time. The map creation processing and the position recognition (estimation) processing are simultaneously performed in accordance with the algorithm of the SLAM technology. The map generation unit 17 is capable of generating the environmental map not only when traveling in the manual drive mode but also when traveling in the self-drive mode. In a case where the environmental map has already been generated and stored in the memory unit 12, the map generation unit 17 may update the environmental map, based on a newly extracted feature point (may be referred to as a new feature point) from a newly acquired camera image.

By the way, the greater the number of feature points used for generation processing of an environmental map using the SLAM technology, the more accurate the matching between the environmental map and the camera image, and the more accurate the estimation of the subject vehicle position becomes. However, when a large number of feature points are extracted from the vicinity of the subject vehicle to a distant place in the camera image, the processing load becomes excessively large. Therefore, it is desirable to select a feature point of a ground object, which is important in terms of a map, in the camera image in preference to feature points of other ground objects and to suppress the total number of feature points used for processing.

In the embodiment, the identical feature points are tracked across a plurality of frames of camera images according to the algorithm of the SLAM technology, and the three-dimensional positions are calculated for the feature points. At that time, a distance from the subject vehicle to the feature point (object) extracted from the camera image is acquired, and the number of feature points is adjusted to such an extent that the number of feature points on objects close to the subject vehicle and the number of feature points far from the subject vehicle do not deviate more than necessary.

The image processing apparatus that executes the above processing will be described in more detail.

Figure 2:
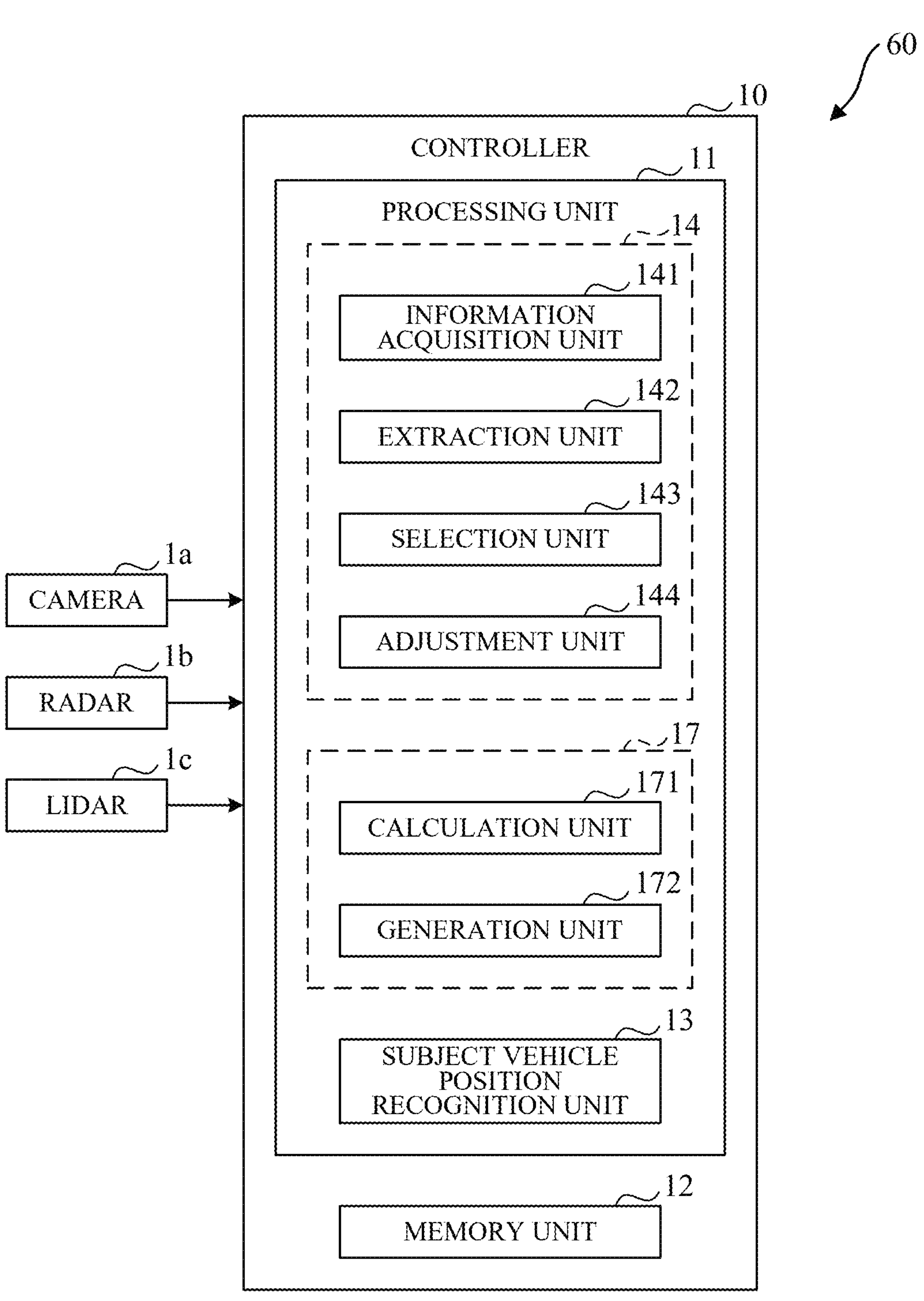
FIG. 2 is a block diagram illustrating a main configuration of an image processing apparatus according to the embodiment.

FIG. 2 is a block diagram illustrating a main configuration of an image processing apparatus 60 according to the embodiment. The image processing apparatus 60 controls the driving operation of the subject vehicle, and constitutes a part of the vehicle control system 100 of FIG. 1. As illustrated in FIG. 2, the image processing apparatus 60 includes the controller 10, a camera 1*a*, a radar 1*b*, and a LiDAR 1*c*.

The camera 1*a* constitutes a part of the external sensor group 1 of FIG. 1. The camera 1*a* may be a monocular camera or a stereo camera, and captures images of the surroundings of the subject vehicle. The camera 1*a* is attached to, for example, a predetermined position in a front part of the subject vehicle, continuously captures images of a space on a forward side of the subject vehicle at a predetermined frame rate, and sequentially outputs frame image data (simply referred to as camera images) as detection information to the controller 10.

Figure 3A:
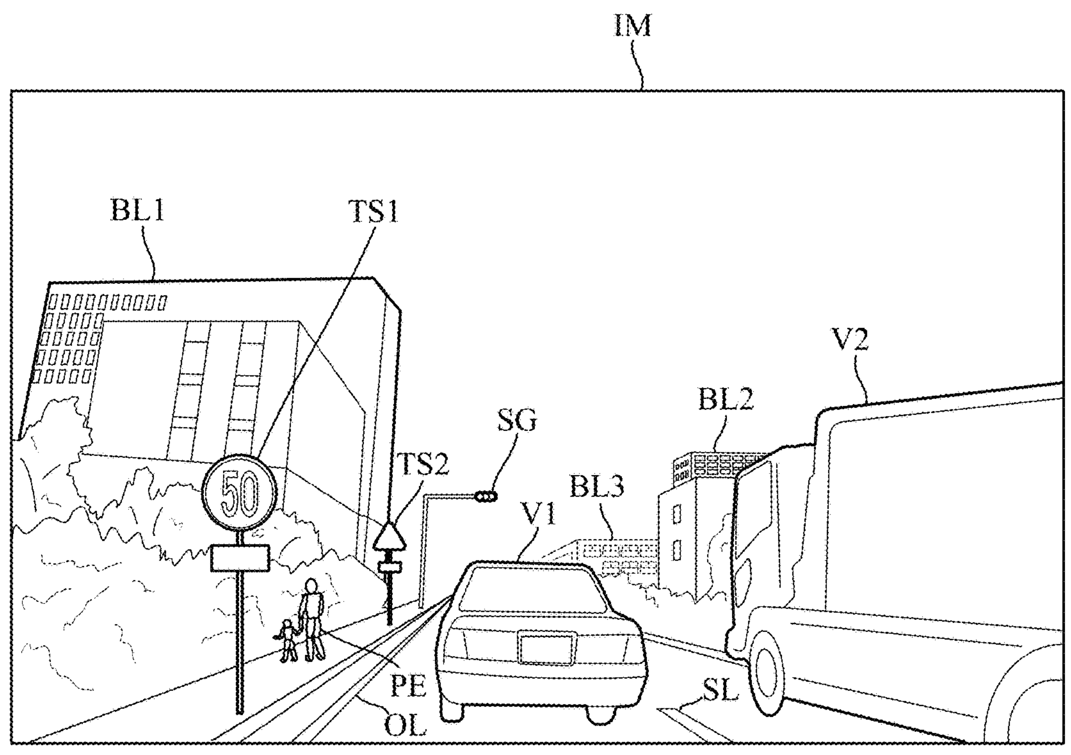
FIG. 3A is a diagram illustrating an example of a camera image.

FIG. 3A is a diagram illustrating an example of the camera image of a certain frame acquired by the camera 1*a*. The camera image IM includes other vehicle V1 traveling in front of the subject vehicle, other vehicle V2 traveling in the right lane of the subject vehicle, a traffic light SG around the subject vehicle, a pedestrian PE, traffic signs TS1 and TS2, buildings BL1, BL2 and BL3 around the subject vehicle, an outside line OL, and a lane line SL.

The radar 1*b* of FIG. 2 is mounted on the subject vehicle and detects other vehicles, obstacles, and the like around the subject vehicle by irradiating electromagnetic waves and detecting reflected waves. The radar 1*b* outputs detection values (detection data) as detection information to the controller 10. The LiDAR 1*c* is mounted on the subject vehicle, measures scattered light with respect to irradiation light in all directions of the subject vehicle, and detects a distance from the subject vehicle to an obstacle in the surroundings. The LiDAR 1*c* outputs detection values (detection data) as detection information to the controller 10.

The controller 10 includes a processing unit 11 and a memory unit 12. The processing unit 11 includes, as functional configurations, an information acquisition unit 141, an extraction unit 142, a selection unit 143, an adjustment unit 144, a calculation unit 171, a generation unit 172, and a subject vehicle position recognition unit 13.

The information acquisition unit 141, the extraction unit 142, the selection unit 143, and the adjustment unit 144 are included in, for example, the exterior environment recognition unit 14 in FIG. 1.

The calculation unit 171 and the generation unit 172 are included in, for example, the map generation unit 17 in FIG. 1.

The information acquisition unit 141 acquires information used for controlling the driving operation of the subject vehicle from the memory unit 12. In more detail, the information acquisition unit 141 reads landmark information included in the environmental map from the memory unit 12, and further acquires, from the landmark information, information indicating the positions of division lines of the road on which the subject vehicle is driving, and the extending directions of the division lines (hereinafter referred to as division line information).

Note that when the division line information does not include the information indicating the extending direction of the division lines, the information acquisition unit 141 may calculate the extension direction of the division lines on the basis of the position of the division lines. Furthermore, information indicating the position and the extending direction of division lines of the road on which the subject vehicle is driving may be acquired from road map information or a white line map (information indicating the positions of division lines in white, yellow, or other color) stored in the memory unit 12.

Figure 3B:
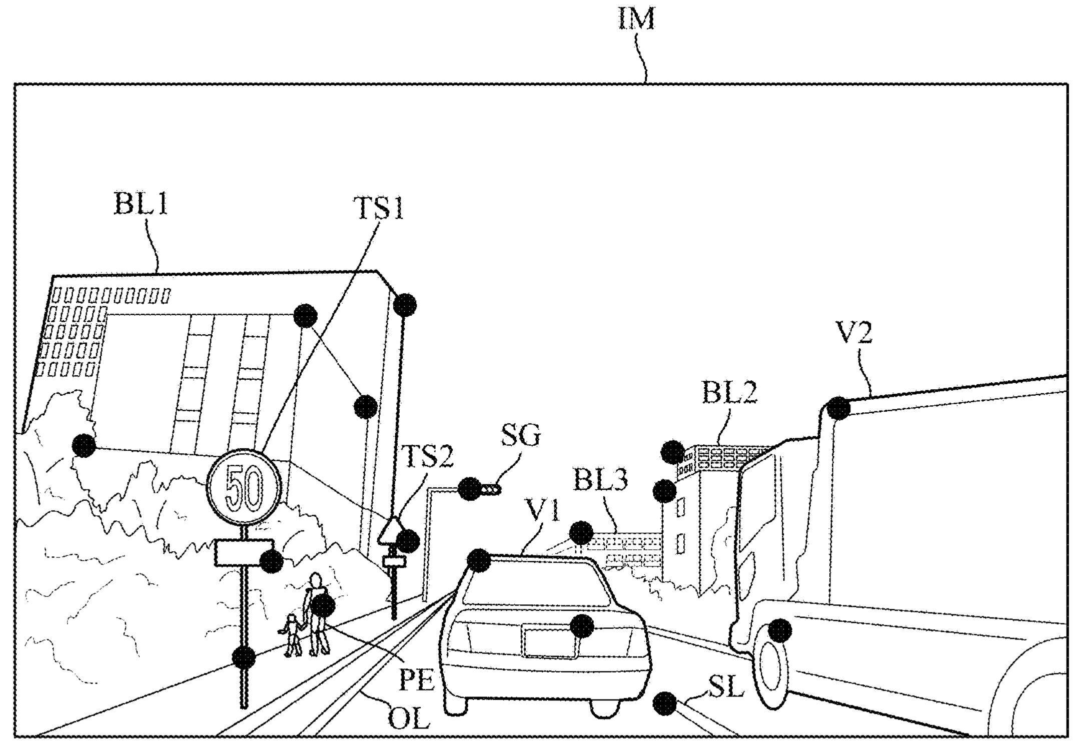
FIG. 3B is a diagram illustrating extracted feature points.

The extraction unit 142 extracts an edge indicating an outline of an object from the camera image IM (illustrated in FIG. 3A), which has been acquired by the camera 1*a*, and also extracts feature points by using edge information. As described above, the feature points are, for example, edge intersections. FIG. 3B is a diagram illustrating the feature points based on the camera image IM of FIG. 3A. Black circles in the drawing represent feature points.

Note that the extraction unit 142 according to the embodiment sets a stationary object included in the camera image IM as a feature point extraction target and excludes a moving object from the feature point extraction target. This is because, as described above, a ground object that is important in terms of a map, in other words, a ground object (a tall tree, a traffic light, a sign located above a road, or the like) useful for estimation of a self-position and map generation is a stationary object and is not a moving object.

The stationary object and the moving object may be identified as follows, for example. The image data of the stationary object (in other words, an object fixed to the ground) is set as the feature point extraction target since the positions on the environmental map match between the frames of the camera image IM. On the other hand, the image data of the moving object is excluded from the feature point extraction target since the positions on the environmental map do not match between the frames.

The selection unit 143 selects feature points for calculating three-dimensional positions from among the feature points that have been extracted by the extraction unit 142. For example, a feature point that is a unique feature point that is easily distinguished from other feature points and is left after the adjustment processing by the following adjustment unit 144 is selected.

The adjustment unit 144 performs adjustment processing of adjusting the number of feature points as follows.

Figures 4A, 4B:
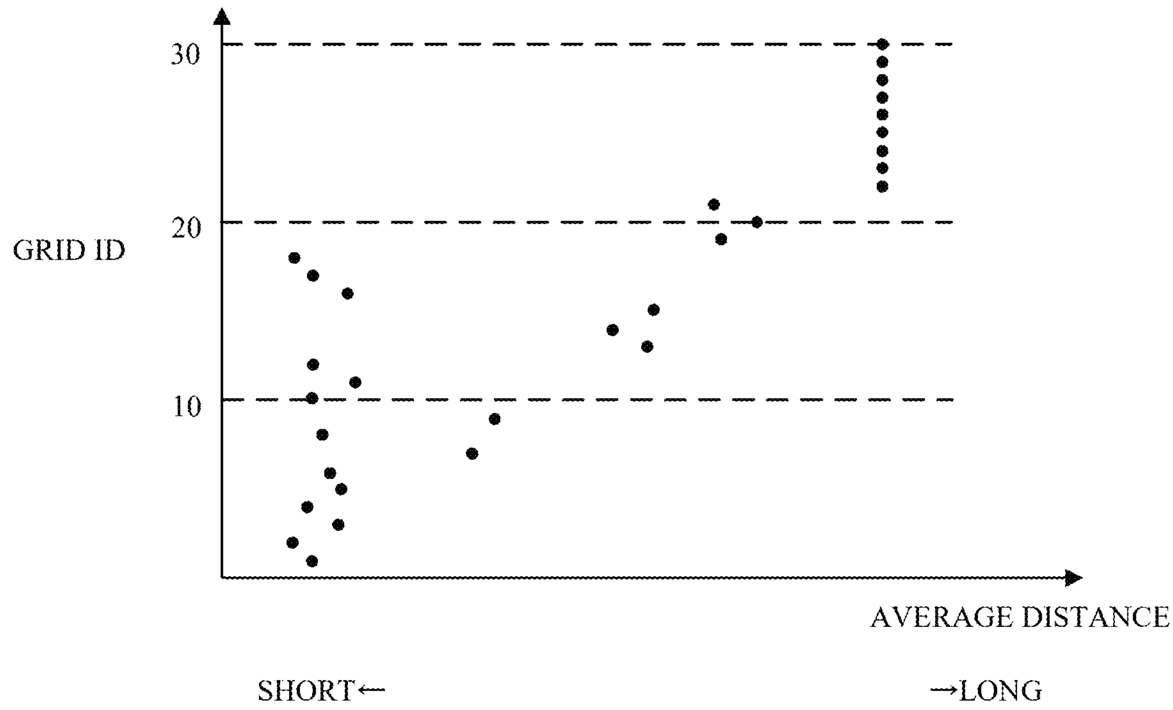
FIG. 4A is a diagram illustrating an example of the camera image divided into regions.
FIG. 4B is a schematic diagram illustrating an average distance of each region in the camera image of a certain frame.

First, the adjustment unit 144 divides the camera image IM into a plurality of regions. FIG. 4A is a diagram illustrating, as an example, the camera image IM divided into a total of 30 regions, arranged in a 6×5 rectangular pattern, as an example. A number described in each region indicates a region ID.

Next, the adjustment unit 144 calculates an average value (referred to as an average distance) of distances to the feature points extracted in each region. FIG. 4B is a schematic diagram illustrating an average distance of each region in the camera image IM of a certain frame. A horizontal axis represents the average distance, and a vertical axis represents the region ID. The average distance and the region ID illustrated in FIG. 4B are of a camera image different from the camera image IM illustrated in FIGS. 3A and 3B. Note that the region ID may be referred to as a grid ID.

The adjustment unit 144 reduces the number of feature points in a region where an average distance to the feature points (the surface of an object) is longer among the plurality of regions, so as to be smaller than the number of feature points in a region where the average distance is shorter. In other words, more feature points in a region with a shorter average distance to the feature points are left as selection targets than feature points in a region with a longer average distance.

In the example illustrated in FIG. 4B, the average distances of the region IDs 1 to 6, 10 to 12, and 16 to 18 are shorter than the average distances of the other region IDs. Therefore, by reducing the number of feature points of the region IDs 7 to 9, 13 to 15, and 19 to 30, more feature points of the region IDs 1 to 6, 10 to 12, and 16 to 18 are left as the selection targets.

The adjustment unit 144 further leaves, as the selection targets, more feature points on the object from which more feature points have been extracted in each region than feature points on other objects in the region. In other words, in each region, the number of feature points on the object in which the number of extracted feature points is small is reduced.

Note that, in a case where the number of feature points extracted from the camera image IM is equal to or less than a predetermined number, the adjustment unit 144 may omit adjustment of the number of feature points with respect to the camera image IM of the frame.

The exterior environment recognition unit 14 performs the above-described acquisition of information by the information acquisition unit 141, the extraction of feature points by the extraction unit 142, the adjustment of the number of feature points by the adjustment unit 144, and the selection of feature points by the selection unit 143 on the camera image IM of each frame acquired by the camera 1*a*.

For the distance information from the camera 1*a* to the feature points (the surface of the object), for example, the exterior environment recognition unit 14 estimates the distance in the depth direction from the camera 1*a* to the object including the feature points on the basis of the position on the image of the object appearing in the camera image IM by using a machine learning (deep neural network (DNN) or the like) technology.

Note that the distance from the subject vehicle to the object may be calculated on the basis of the detection values by the radar 1*b* or the LiDAR 1*c*.

In addition, as will be described later, the subject vehicle position recognition unit 13 may estimate the distance from the subject vehicle to the object on the environmental map on the basis of the positions of the feature points of the landmark appearing in the camera image IM.

The calculation unit 171 in FIG. 2 calculates a three-dimensional position for the feature point while estimating the position and posture of the camera 1*a* so that identical feature points converge on a single point among a plurality of frames of camera images IM. The calculation unit 171 calculates each of three-dimensional positions of a plurality of different feature points that have been selected by the selection unit 143.

The generation unit 172 generates an environmental map including three-dimensional point cloud data including information of each three-dimensional position, by using the three-dimensional positions of the plurality of different feature points that have been calculated by the calculation unit 171.

The subject vehicle position recognition unit 13 estimates the position of the subject vehicle on the environmental map on the basis of the environmental map stored in the memory unit 12.

First, the subject vehicle position recognition unit 13 estimates the position of the subject vehicle in the vehicle width direction. Specifically, the subject vehicle position recognition unit 13 recognizes the road division lines included in the camera image IM newly acquired by the camera 1*a* using a machine learning technology. The subject vehicle position recognition unit 13 recognizes the position and the extending direction of the division lines included in the camera image IM on the environmental map on the basis of the division line information acquired from the landmark information included in the environmental map stored in the memory unit 12. Then, the subject vehicle position recognition unit 13 estimates the relative positional relationship (positional relationship on the environmental map) between the subject vehicle and the division line in the vehicle width direction on the basis of the position and the extending direction of the division line on the environmental map. In this manner, the position of the subject vehicle in the vehicle width direction on the environmental map is estimated.

Next, the subject vehicle position recognition unit 13 estimates the position of the subject vehicle in an advancing direction. Specifically, the subject vehicle position recognition unit 13 recognizes a landmark (for example, a building BL1) from the camera image IM (FIG. 3A), which has been newly acquired by the camera 1*a* in processing such as pattern matching, and also recognizes feature points on such a landmark from the feature points that have been extracted by the extraction unit 142. Furthermore, the subject vehicle position recognition unit 13 estimates a distance in the advancing direction from the subject vehicle to the landmark, on the basis of the positions of the feature points on the landmark that appears in the camera image IM. Note that the distance from the subject vehicle to the landmark may be calculated on the basis of a detection value of the radar 1*b* and/or the LiDAR 1*c*.

The subject vehicle position recognition unit 13 searches for the feature points corresponding to the above landmark in the environmental map stored in the memory unit 12. In other words, the feature point matching the feature point of the landmark recognized from the newly acquired camera image IM is recognized from among the plurality of feature points (point cloud data) constituting the environmental map.

Next, the subject vehicle position recognition unit 13 estimates the position of the subject vehicle in the advancing direction on the environmental map, on the basis of the position of the feature point on the environmental map corresponding to the feature point of the landmark and the distance from the subject vehicle to the landmark in the advancing direction.

As described heretofore, the subject vehicle position recognition unit 13 recognizes the position of the subject vehicle on the environmental map, on the basis of the estimated position of the subject vehicle on the environmental map in the vehicle width direction and in the advancing direction.

The memory unit 12 stores the information of the environmental map generated by the generation unit 172. The memory unit 12 also stores information indicating the driving trajectory of the subject vehicle. The driving trajectory is represented, for example, as the subject vehicle position on the environmental map that has been recognized by the subject vehicle position recognition unit 13 while the subject vehicle is traveling.

<Description of Flowchart>

Figure 5A:
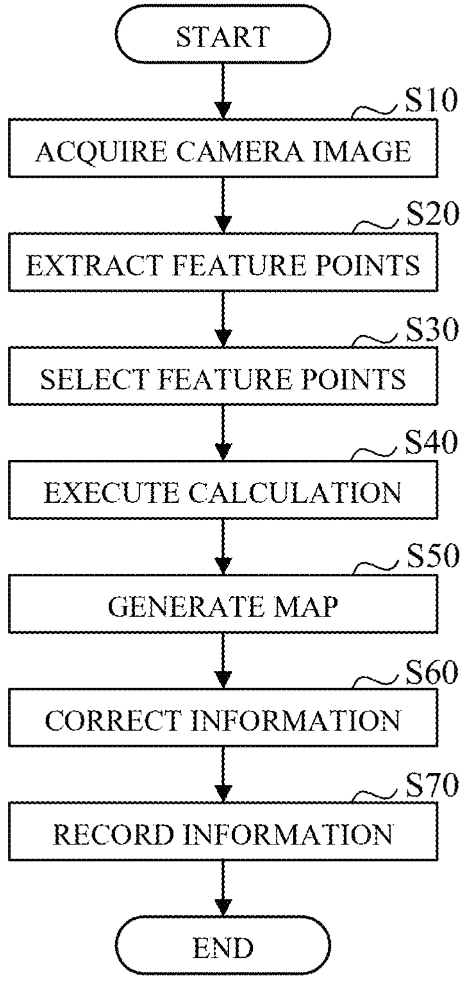
FIG. 5A is a flowchart illustrating an example of processing to be performed by the controller in FIG. 2.
Figure 5B:
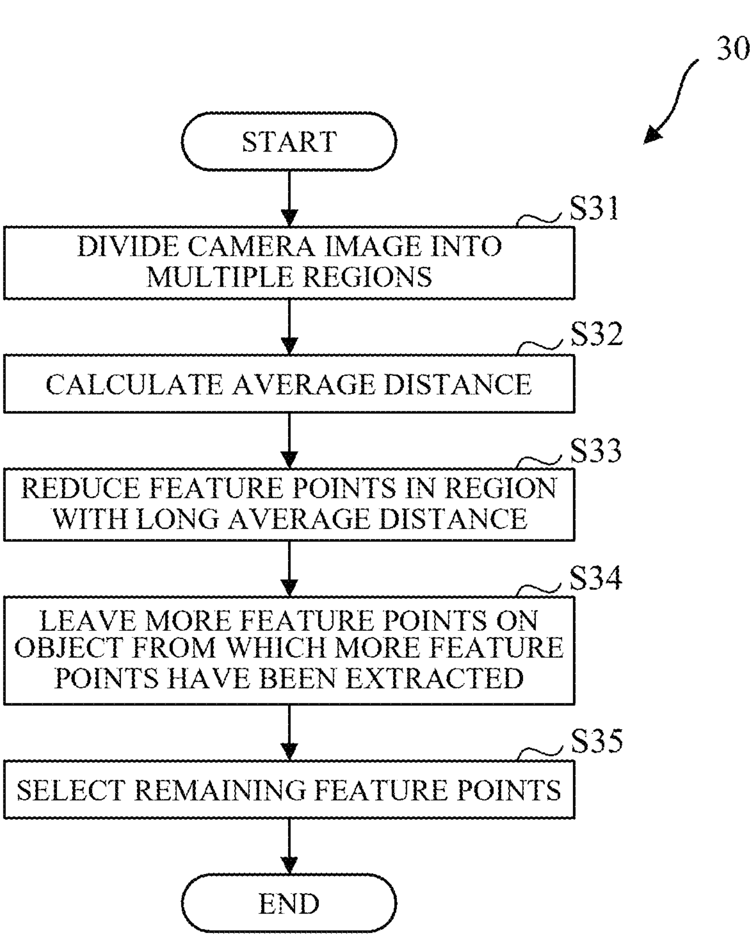
FIG. 5B is a flowchart illustrating an example of processing to be performed by the controller in FIG. 2.

An example of processing executed by the controller 10 of FIG. 2 according to a predetermined program will be described with reference to flowcharts of FIGS. 5A and 5B. FIG. 5A illustrates processing of creating an environmental map, which is started in, for example, the manual drive mode and repeated at a predetermined cycle. FIG. 5B illustrates the details of step S30 of FIG. 5A.

In step S10 of FIG. 5A, the controller 10 acquires the camera image IM as detection information from the camera 1*a*, and proceeds to step S20.

In step S20, the controller 10 causes the extraction unit 142 to extract feature points from the camera image IM, and the processing proceeds to step S30.

In step S30, the controller 10 causes the selection unit 143 to select feature points, and the processing proceeds to step S40.

In step S40, the controller 10 causes the calculation unit 171 to calculate each of three-dimensional positions of a plurality of different feature points, and the processing proceeds to step S50.

In step S50, the controller 10 causes the generation unit 172 to generate an environmental map including three-dimensional point cloud data including information of each of the three-dimensional positions of the plurality of different feature points, and the processing proceeds to step S60.

In step S60, if the controller 10 recognizes that the traveling position of the subject vehicle is on the past traveling trajectory, it corrects the information of the three-dimensional position included in the environmental map by loop closing processing, and proceeds to step S70.

The loop closing processing is briefly described below. Generally, in the SLAM technology, the subject vehicle recognizes the position of the subject vehicle, while the subject vehicle is moving. Therefore, errors are accumulated. For example, when the subject vehicle travels around a closed square road, the positions of start and end points do not match due to accumulated errors. Therefore, when it is recognized that the traveling position of the subject vehicle is on the past traveling trajectory, loop closing processing is executed to make the coordinates of the subject vehicle position recognized using feature points extracted from the camera image newly acquired (referred to as new feature points) at the same traveling point as in the past and the position of the subject vehicle recognized in the past using feature points extracted from the camera image acquired at the past traveling time the same coordinates.

In step S70, the controller 10 causes the memory unit 12 to record the information of the environmental map, and ends the processing according to FIG. 5A.

In step S31 of FIG. 5B, the adjustment unit 144 divides the camera image IM into a plurality of regions, and the processing proceeds to step S32.

In step S32, the adjustment unit 144 calculates an average distance that is an average value of distances to the feature points extracted in each region, and the processing proceeds to step S33.

As described above, the distances to the feature points can be estimated as the distance in the depth direction from the camera 1*a* to the object surface corresponding to the feature points.

In addition, a distance calculated on the basis of the detection values of the radar 1*b* or the LiDAR 1*c* may be acquired.

Furthermore, the subject vehicle position recognition unit 13 may acquire a distance estimated on the environmental map on the basis of the positions of the feature points of the landmark appearing in the camera image IM.

In step S33, the adjustment unit 144 reduces the feature points in the region with a long average distance, and the processing proceeds to step S34. As described above, more feature points in a region with a shorter average distance to the feature points are left as selection targets than feature points in a region with a longer average distance.

In step S34, the adjustment unit 144 leaves more feature points on the object from which more feature points have been extracted, and the processing proceeds to step S35. As described above, in each region, the number of feature points on the object in which the number of extracted feature points is small is reduced.

In step S35, the selection unit 143 selects the feature points remaining in each region after the adjustment by the adjustment unit 144, and ends the processing according to FIG. 5B.

According to the above-described embodiment, the following effects can be achieved.

(1) The image processing apparatus 60 is an image processing apparatus for detecting an external situation of a subject vehicle on the basis of the camera image IM as image information acquired by the camera 1*a* as a detection unit mounted on the subject vehicle, and includes: the extraction unit 142 that extracts feature points of an object included in the camera image IM; the selection unit 143 that selects feature points to be used for processing from a plurality of feature points extracted by the extraction unit 142; and the adjustment unit 144 that divides the camera image IM into a plurality of grid-shaped regions as an example, and adjusts the number of feature points to be selected in each region on the basis of distances to objects included in the plurality of regions.

With this configuration, the number of feature points for each region of the camera image IM is optimized on the basis of the distances to the object, so that the total number of feature points used for processing can be suppressed. Therefore, for example, the load of processing when calculating a three-dimensional position of the feature point is reduced, and it is possible to quickly generate environmental map necessary for safe vehicle control.

(2) In the image processing apparatus 60 of (1), the adjustment unit 144 performs adjustment so as to leave feature points on an object from which more feature points have been extracted by the extraction unit 142.

With such a configuration, a more characteristic point on the object is adopted for the processing, so that the processing can be performed on the basis of more reliable information in the camera image IM.

(3) In the image processing apparatus 60 of (1) or (2), the adjustment unit 144 further includes a function as a distance measurement unit that calculates a distance to an object on the basis of the camera image IM, calculates an average distance from a subject vehicle position to the plurality of feature points for each region on the basis of a calculation result of the distance, and adjusts the number of feature points so that the number of feature points is reduced as the average distance increases in the region.

In general, since the feature point far from the subject vehicle has less influence on traveling than the feature point near the subject vehicle, the total number of feature points of the camera image IM used for processing can be appropriately suppressed by reducing the number of feature points in a region with a longer average distance as compared with a region with a shorter average distance. As a result, for example, the load of processing when calculating a three-dimensional position of the feature point is reduced, and it is possible to quickly generate environmental map necessary for safe vehicle control.

(4) In the image processing apparatus 60 of (1) to (3), the extraction unit 142 sets a stationary object included in the camera image IM as a feature point extraction target and excludes a moving object from the feature point extraction target.

With this configuration, for example, even for an object appearing in the upper part of the screen of the camera image IM, a ground object (for example, a tall tree, a traffic light, a sign located above a road, or the like) useful for estimation of a self-position and map generation is a feature point extraction target. As a result, it is possible to appropriately generate the environmental map necessary for safe vehicle control.

(5) The image processing apparatus 60 of (1) to (4) further includes: the memory unit 12 that stores a plurality of frames of camera images IM in units of frames; the map generation unit 17 as a search unit that searches for a set of the identical feature points commonly included in the camera images IM of the plurality of frames stored in the memory unit 12; and the subject vehicle position recognition unit 13 as an estimation unit that performs subject vehicle position estimation on the basis of the set of the feature points searched for by the map generation unit 17.

With such a configuration, it is possible to search for a set of the identical feature points commonly included in the camera image IM between different frames and accurately perform subject vehicle position estimation.

(6) In the image processing apparatus 60 of (5), the subject vehicle position recognition unit 13 interrupts the subject vehicle position estimation when a reliability of the estimated subject vehicle position decreases by the predetermined number or more of times. More specifically, when the reliability of the subject vehicle position estimation decreases by the predetermined number or more of times between the frames, or when the reliability of the subject vehicle position estimation decreases between frames of the predetermined number of consecutive frames, the subject vehicle position estimation is interrupted.

With such a configuration, in a case where the reliability of the subject vehicle position estimation decreases, it is possible to reduce unnecessary processing by interrupting the subject vehicle position estimation itself as compared with a case where the subject vehicle position estimation is not interrupted.

(7) In the image processing apparatus 60 of (5) or (6), the subject vehicle position recognition unit 13 interrupts the subject vehicle position estimation according to a situation of the subject vehicle.

With such a configuration, for example, in a case where a situation where it is difficult to continue traveling of the subject vehicle is predicted due to an accident such as a puncture, deterioration of a road surface condition, or the like, it is possible to reduce unnecessary processing by interrupting the subject vehicle position estimation itself as compared with a case where the subject vehicle position estimation is not interrupted.

(8) The image processing apparatus 60 of (1) or (2) further includes: the calculation unit 171 that calculates three-dimensional positions of the identical feature points commonly included in the image information of the plurality of frames for each of the plurality of different feature points selected by the selection unit 143; and the generation unit 172 and the subject vehicle position recognition unit 13 as processing units that perform map generation and subject vehicle position estimation on the basis of the three-dimensional positions of the plurality of different feature points calculated by the calculation unit 171. The adjustment unit 144 calculates an average distance from a subject vehicle position to the plurality of feature points for each region on the basis of a calculation result by the subject vehicle position recognition unit 13, and adjusts the number of feature points so that the number of feature points is reduced as the average distance increases.

In general, since the feature point far from the subject vehicle has less influence on traveling than the feature point near the subject vehicle, the total number of feature points of the camera image IM used for processing can be appropriately suppressed by reducing the number of feature points in a region with a longer average distance as compared with a region with a shorter average distance. As a result, for example, the load of processing when calculating a three-dimensional position of the feature point is reduced, and it is possible to quickly generate environmental map necessary for safe vehicle control.

The above embodiment can be modified into various forms. Hereinafter, modifications will be described.

First Modification

The number of regions illustrated in FIG. 4A is an example, and may be appropriately changed. In addition, although an example of dividing the region into a plurality of quadrangular regions (may be referred to as a lattice shape) has been described, the region may be divided into a plurality of hexagonal regions (may be referred to as a honeycomb shape).

Second Modification

In the above description, an example has been described in which the average distance from the subject vehicle position to the plurality of feature points in the region is calculated for each region, and the number of feature points is adjusted so that the number of feature points decreases as the average distance increases.

Instead of the average distance from the subject vehicle position to the plurality of feature points in the region, on the basis of a median value of the distances from the subject vehicle position to the plurality of feature points in the region, the number of feature points may be adjusted so that the number of feature points decreases as the median value of the distance increases in the region.

Third Modification

Furthermore, in the above description, an example has been described in which the number of feature points is adjusted so that the number of feature points decreases in a region farther from the subject vehicle position. In addition, in the region near the subject vehicle position, the number of feature points on an object close to the subject vehicle position may be increased to such an extent that does not cause deviation from the number of feature points on an object far from the subject vehicle position more than necessary. The object for which the number of feature points is to be increased near the subject vehicle position is, for example, a ground object that is important in terms of a map.

That is, the adjustment unit 144 adjusts the number of feature points so as to increase the number of feature points on the object determined in advance as the ground object that is important in terms of a map, regardless of the average distance for each region from the subject vehicle position to the plurality of feature points.

With this configuration, detection accuracy of the feature point near the subject vehicle position is improved, and the subject vehicle position recognition unit 13 can accurately recognize the subject vehicle position.

The above embodiment can be combined as desired with one or more of the above modifications. The modifications can also be combined with one another.

According to the present invention, it becomes possible to appropriately detect exterior environment information necessary for safe vehicle control.

Above, while the present invention has been described with reference to the preferred embodiments thereof, it will be understood, by those skilled in the art, that various changes and modifications may be made thereto without departing from the scope of the appended claims.

What is claimed is:

1. An image processing apparatus configured to detect an external situation of a vehicle based on image information acquired by a detection unit mounted on the vehicle, the image processing apparatus comprising a microprocessor configured to perform:

extracting feature points of an object included in the image information;

selecting feature points to be used for processing from a plurality of the feature points;

dividing the image information into a plurality of regions; and adjusting a number of feature points to be selected in each of the plurality of regions based on distances to objects included in the plurality of regions, wherein the microprocessor is configured to perform:

the adjusting including:

calculating a distance to the object based on the image information;

calculating an average distance from a position of the vehicle to the plurality of feature points for each of the plurality of regions based on a result of the calculating the distance;

adjusting the number of feature points so as to reduce the number of feature points in an area where the average distance is longer; and adjusting the number of feature points so as to increase the number of feature points on an object determined in advance, regardless of the average distance for each of the plurality of regions from the position of the vehicle to the plurality of feature points.

2. The image processing apparatus according to claim 1, wherein the microprocessor is configured to perform:

the adjusting including performing adjustment so as to leave feature points on an object from which more feature points have been extracted.

3. The image processing apparatus according to claim 1, wherein the microprocessor is configured to perform:

the adjusting including calculating a median value of distance from the position of the vehicle to the plurality of feature points for each of the plurality of regions based on a result of the calculating the distance, and adjusting the number of feature points so as to reduce the number of feature points in an area where the median value is larger.

4. The image processing apparatus according to claim 1, wherein the microprocessor is configured to perform:

setting a stationary object included in the image information as an extraction target of feature points and excluding a moving object from the extraction target.

5. The image processing apparatus according to claim 1 further comprising a memory coupled to the microprocessor, wherein the memory stores a plurality of frames of the image information in units of frames, and the microprocessor is configured to further perform:

searching for a set of identical feature points commonly included in the image information of the plurality of frames stored in the memory; and performing estimation of the position of the vehicle based on the set of identical feature points.

6. An image processing apparatus configured to detect an external situation of a vehicle based on image information acquired by a detection unit mounted on the vehicle, the image processing apparatus comprising a microprocessor configured to perform:

extracting feature points of an object included in the image information;

selecting feature points to be used for processing from a plurality of the feature points;

dividing the image information into a plurality of regions; and adjusting a number of feature points to be selected in each of the plurality of regions based on distances to objects included in the plurality of regions, and a memory coupled to the microprocessor, wherein the memory stores a plurality of frames of the image information in units of frames, wherein the microprocessor is configured to further perform:

searching for a set of identical feature points commonly included in the image information of the plurality of frames stored in the memory;

performing estimation of a position of the vehicle based on the set of identical feature points; and interrupting the estimation of the position of the vehicle when a reliability of the position estimated in the estimation decreases by a predetermined number of times or more.

7. The image processing apparatus according to claim 6, wherein the microprocessor is configured to perform:

interrupting the estimation of the position of the vehicle according to a situation of the vehicle.

8. An image processing apparatus configured to detect an external situation of a vehicle based on image information acquired by a detection unit mounted on the vehicle, the image processing apparatus comprising a microprocessor configured to perform:

extracting feature points of an object included in the image information;

selecting feature points to be used for processing from a plurality of the feature points;

dividing the image information into a plurality of regions; and adjusting a number of feature points to be selected in each of the plurality of regions based on distances to objects included in the plurality of regions, wherein the microprocessor is configured to further perform:

calculating three-dimensional positions of identical feature points commonly included in the image information of a plurality of frames for each of a plurality of different feature points; and performing map generation and estimation of a position of the vehicle based on the three-dimensional positions of the plurality of different feature points, wherein the adjusting includes calculating an average distance from the position of the vehicle to the plurality of feature points for each of the plurality of regions based on results of the map generation and the estimation of the position of the vehicle, and adjusting the number of feature points so as to reduce the number of feature points in a region where the average distance is longer.

* * * * *